March 18, 1930. W. HOFF 1,751,084
AUTOMATIC EMERGENCY CONTROL
Filed March 14, 1928 4 Sheets-Sheet 1

Waldemar Hoff INVENTOR.
per ATTORNEY.

Patented Mar. 18, 1930

1,751,084

UNITED STATES PATENT OFFICE

WALDEMAR HOFF, OF OSLO, NORWAY

AUTOMATIC EMERGENCY CONTROL

Application filed March 14, 1928, Serial No. 261,606, and in Norway January 3, 1928.

This invention relates to the automatic emergency of locomotives, motor wagons and other machines by safety devices of the "dead man's button" type.

The different operations in a locomotive during a journey usually require the service of two men, but, by utilizing electrical apparatus, the work can easily be effected by one man.

"One-man operation" is therefore generally used both on electric tracks where the traffic is of simple proportions, and on tramways and light railways which are used mainly by motor wagons and small tractors. On the other hand, when it is attempted to install "one-man operation" in locomotives for electrically-driven full-sized tracks, it is found that safety in running, under heavy traffic conditions, is not obtainable by the operation of the locomotive by one man only, because the said man in this case may be suddenly rendered incapable of attending to his duty. With most electric railways, therefore, it is the rule that two men must be present on the locomotive during the journey, though the one has nothing to do except take over the work of the driver, or bring the train to a stop, if the driver is disabled or becomes unconscious.

The question of "one-man operation" of locomotives is nevertheless a matter of such economic importance for railways, especially in competition with other transport means, that a solution of the safety problem is an urgent necessity.

The method of relying on the train staff to stop the train when the driver is disabled or becomes unconscious has not shown itself to be wholly effective, and though it is found sufficient under simple traffic conditions, it is scarcely capable of being applied with advantage to heavy traffic conditions. The safety called for in regulations relating to compound trains (i. e. trains having a passage from the carriage to the locomotive, and accommodation for the train staff during the journey) is difficult to achieve except at the cost of foregoing the economic advantages of "one-man operation," because the fulfillment of the regulations generally causes both inconvenience and expense. The safety obtained, also is of a doubtful nature, partly because the driver's incapacity is usually first indicated by an accident in the running of the train itself, and partly because regulations relating to interferences by the train staff seldom work well in practice and there is no securing that they are obeyed.

It appears, therefore, that on full sized tracks, the solution of the safety problem in connection with "one-man operation" must be effected by devices which offer at least the same security as operation by the usual two men.

The most effective of the safety devices at present known are those of the "dead man's button" type. The "dead man's button" is adapted to be engaged by the hand or foot of the driver during the journey and if he lets go the button, it is self-operative through automatic safety means to effect the stopping of the train, firstly by interrupting the supply of power and, secondly by applying the brakes, whilst, simultaneously, the locomotive whistle or another warning device is put into action.

In its simplest form, the automatic safety device acts at the same moment as the "dead man's button" is let go. Such an arrangement hinders to a great extent the freedom of the driver. It is usually desirable to allow the driver to let go the button (without such action stopping the train) over a shorter stretch than, for example, 110 yards.

For this purpose, other automatic safety devices have been provided whereby the operation resulting from the release of the "dead man's button" only takes place after a predetermined time.

This is effected in such a manner, for example, that an electromagnet does not operate the power means and brakes directly but only serves to thrust a sleeve onto a screwed spindle rotatable by the locomotive, so that the said sleeve acts on the power means and brakes only after a predetermined time. Instead of the movable sleeve, a worm wheel or similar means may be connected with the rotatable spindle.

The freedom achieved by a time-limit automatic safety device cannot prevent the "dead man's button" under certain conditions being burdensome to the driver, especially when shunting, because he must give attention to both sides of the locomotive and therefore requires greater freedom of movement than in the course of the ordinary train journey. Since safety devices are unnecessary under such conditions, the object has been to find a proper device which goes automatically out of operation when not required and returns into operation when conditions again make it desirable or necessary.

For this purpose, an arrangement has been proposed in which the safety device only operates when a definite rate of travel is exceeded, due to the fact that the supplies of current for the device are dependent on contacts which are suspended, for example, by a centrifugal regulator.

The above mentioned improvement, however, does not prevent the use of the "dead man's button" being felt as burdensome as ever. Experience has shown that an irresponsible driver has himself caused the "dead man's button" to be loaded or held in the depressed position so that the device remains out of operation. A sudden collapse of the driver is then the cause of great damage and, perhaps loss of life. Such damage can also happen when the "dead man's button" is held depressed by the body of the driver in spite of his unconsciousness.

Different constructions have been proposed in order to remove the last mentioned difficulty in respect of the "dead man's button", without an effective means having yet been found.

As apparently, a safety device is not reliable if it can be rendered inoperative by any appropriate object whatsoever, movable safety devices have been proposed, based on the principle that the train is stopped after running a definite time if the driver does not positively operate the device within this period.

With arrangements of this kind, safety is obtained with certainty only in the moment in which positive operation by the driver is needed. In the interval between each such operation, there is no guarantee of safety whatever. Such guarantee can be attained only if the device is so arranged that it must be operated at short intervals, approximately 4 to 10 seconds. This very frequent operation would require attention and labour incompatible with the driver's other tasks and would be such a burden to him that he could do nothing else. Arrangements of this kind therefore have no practical application to railways.

The purpose of the present invention is to remedy the disadvantages of the prior safety devices which were hindrances to a feasible "one-man operation" for full-sized tracks.

The chief requirement is that the safety device must be ready at any time during the journey to come into operation, immediately the driver leaves off the performance of his duties.

This requirement can be fulfilled only when the device is operated without interruption. The operation, further, must be combined with the other tasks of the driver and must not tire him by reason of his having to maintain a single position, however restful.

According to the present invention, I provide a method of effecting the automatic emergency control of locomotives, motor wagons and other machines by safety devices of the "dead man's button" type, characterized by the fact that the normal running condition of the locomotive or other machine is maintained by the operation of means driven thereby and also by the independent operation of the safety device, as determined by the "dead man's button" through auxiliary means operating independently of the speed of the locomotive or other machine. Preferably, in my improved method, the driver operates and holds the "dead man's button" for driving purposes, but if the latter is freed temporarily, the stoppage of the locomotive or other machine is prevented by a second operation of the "dead man's button" followed by the driver maintaining his hold on the "dead man's button" as before.

Preferably, the apparatus for effecting the said automatic emergency control comprises an interrupter which, in conjunction with a switch and "dead man's button" is adapted to cut out the action of the safety device, whilst the switch, by the release of the "dead man's button" is adapted to check the operation of the interrupter, so that by operating the said button the safety device can be again set ready for operation. The current circuit through the safety device and the interrupter may be adapted to be closed by contacts in the said switch, by contacts in a relay, and by contacts in one or more interrupting switches mechanically operated and directly or indirectly put into circuit, and is opened by interruption effected by the interrupting switch or switches and by the contacts of the electromagnet relay. If desired, the current circuit through the electromagnet relay and the switch of the "dead man's button" is closed by contacts in the said switch itself, an electromagnet armature attracted thereby closing contacts situated beyond the interrupting switch so that the circuit is maintained by these contacts when the "dead man's button" is operated.

Preferably, the necessity for operating the "dead man's button" is indicated by an arrangement which acts directly on the hand or foot of the driver which operates the said button.

The stoppage of the locomotive or other machine is preferably effected after a time limit, by means of a mechanically operated current interrupter, which co-operates with one or more relays so that, the interrupter effects stoppage when in one or more predetermined positions. If desired, I may provide several series connected current breakers driven at different speeds so as to effect an adjustable retardation of the stoppage. One or more of the operating handles of the locomotive or other machine may have switches connected therewith in such a manner that, by the normal hand operation of such handles, a retarded stoppage is effected.

Preferably, the operating means of the safety device is so arranged that by failure in any part whatever of the apparatus, stoppage is effected. The safety device may also be operable by open circuit current as well as closed circuit current, for the purpose of effecting stoppage on mechanical failure in the locomotive or other machine.

If desired, the safety device may be connected with a switch which puts it out of operation in order to permit, in the case of a locomotive, free shunting, and, in the case of other machines, any short and irregular backward or forward movements which may be necessary; whilst the said switch is automatically put out of circuit after a predetermined amount of movement of the locomotive or other machine in one direction.

In order that the invention may be clearly understood, reference will now be made to the accompanying drawings:—

Figure 1:
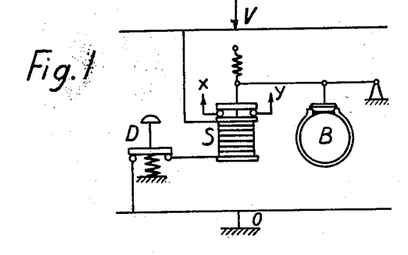
Fig. 1 is a diagrammatic view of a known safety device, shown and described herein for the purpose of distinguishing the novelty of the present invention.

In Fig. 1, D indicates the "dead man's button" which is connected with an automatic and instantaneously-operating safety device S. Between the earthed conductor O and the current-carrying conductor V is a known working voltage. If the "dead man's button" remains depressed, the current runs through the electromagnet S, its armature remains attracted and the main current circuit $x$, $y$ thereby remains closed, as does also the valve in the brake conduit B. If the button is released, the electromagnet S is de-energized, the main current is interrupted and the brake valve is opened.

Figure 2:
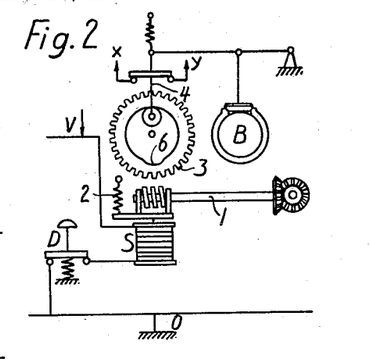
Fig. 2 is a diagrammatic view of a known time-adjustable safety device, shown and described herein for the purpose stated with reference to Fig. 1.

According to Fig. 2, the armature of the electromagnet S is not connected directly with the brake valve nor arranged so as to act directly on the main connections, but it forms a support for a rotatable spindle 1 continuously driven by the locomotive. When, in this case, the button D is let go, the worm formed on the spindle 1 is brought into engagement with the worm-wheel 3 by a spring 2, which wheel is thereby set slowly rotating till a rod 4, after a given time, corresponding for example to about 110 yards of the journey is drawn by a spring 5 into a recess 6, so that the main current is interrupted and the brake valve is opened.

Figure 3:
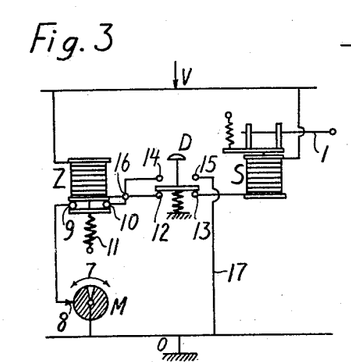
Figs. 3 to 14 are diagrammatic views of different constructional forms of the present invention.

The diagrammatic view in Fig. 3 corresponds with the known arrangement, Fig. 1, but shows an apparatus having two new devices, namely a mechanical current breaker S and an electromagnetic current breaker Z. The first consists of a contact disc or drum driven by the locomotive, which arrangement keeps the contacts closed, except when the connection is momentarily interrupted in the course of each revolution by the interrupter gap or field 7 passing the contact point 8. The electromagnet current breaker consists of an electromagnet Z which closes contacts 9 and 10 by an attracted armature. When the electromagnet Z is de-energized, the spring 11 draws back the armature and opens the contacts 9 and 10. The button D closes, in the depressed position, two contacts 12 and 13. In the raised position, these contacts are separated and, instead, the contacts 14 and 15 are closed.

The above described device works in the following manner:—

During normal running, the position corresponding to which is shown in the drawing, the current runs from the conductor V both through the electromagnet Z and through a branch in parallel therewith comprising an automatic safety device S and the contacts 12 and 13. The two branches are united at 16 and the current runs thereafter over the contacts 10, 9 through the mechanical current breaker M to earth O. During normal running, the device S and electromagnet Z are fed with closed circuit current. If the "dead man's button" D is let go, the safety device is immediately de-energized, and the stoppage is complete after the lapse of a definite time, as in safety devices generally known. If, however, the "dead man's button" D is again depressed within this time, the normal running conditions are immediately restored.

The gap 7 of the mechanical interrupter M is adapted to pass the contact point 8 once for example each 1100 yards and interrupts the current in both parallel paths, i. e. through the automatic safety device S and the electromagnet Z. The armature moves away from the latter so that the contacts 9 and 10 are opened. Thereupon, a permanent interruption is effected which is not restored through the mechanical interrupter M if the latter again closes the contact after the gap 7 has passed the contact point 8.

The automatic safety device remains therefore permanently de-energized even if the "dead man's button" D is kept depressed. Stoppage takes place when the given time is ended. The threatened stoppage can be prevented by letting go the "dead man's button" D so that the contacts 14 and 15 are closed and the electromagnet Z again receives current from the parallel conductor 17. Its armature is then attracted and current circuit is again closed through the contacts 9 and 10. The "dead man's button" D must then be depressed again as soon as possible, because the safety device is put out of circuit with the lifted "dead man's button". This can happen without the electromagnet Z being thereby de-energized. The release of the "dead man's button" D and the subsequent depression of the same requires only a moment and must take place after the gap 7 has passed the contact point 8, and, at the latest, before the variable time of the safety device has elapsed.

Usually, for the purpose of convenient manual operation, it is necessary to provide several "dead man's buttons" on each locomotive, any of which buttons can be used by the driver. One or more can be arranged for hand operation, being provided, for example, in the control handle of the locomotive, and the other or others can be made in the form of foot pedals.

Figure 4:
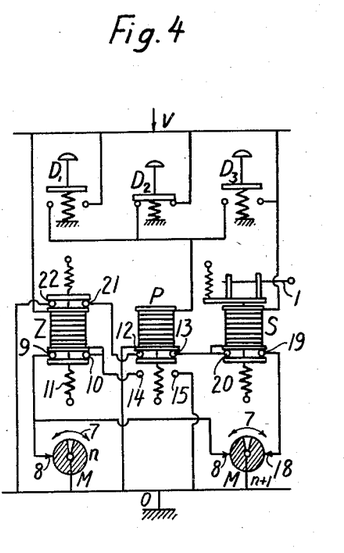

In such arrangements, the described safety device is adapted to be arranged as a central device common to all the "dead man's buttons", as shown in Fig. 4. In this case, an electromagnet P is provided, whose armature opens and closes the contacts which, according to Fig. 3, are directly acted on by the "dead man's button". The movement of this armature is controlled by any one of the "dead man's buttons" $D_1$, $D_2$, $D_3$ arranged in parallel. Instead of centralizing several "dead man's buttons" in a common electromagnet, the latter can be dispensed with by connecting the different contacts 12 and 13 in parallel and the different contacts 14 and 15 in series.

To illustrate that there is no fear of the "dead man's button" locking or being accidentally held down, the foregoing constructional forms may be reviewed.

In all these forms, the supply of the automatic safety device effects a temporary mechanically-produced interruption, which causes, at adjustable or fixed intervals, a permanent interruption in a self-acting device, which can be brought to the position necessary for the said supply only by the driver letting go, or setting back, the "dead man's button". If he is prevented from doing this, the train is stopped.

The interruption effected by the mechanical device M can take place at adjustable or fixed intervals by arranging several interrupting gaps in different positions or by operating several contact devices connected in parallel by differential gear. In Fig. 4, two such devices are shown. These devices rotate at different speeds, for example, one device at ($n$) revolutions in the given time and one at ($n+1$) revolution. Such speeds, for example, may be arranged so as to obtain an effective interruption of about 1 second in duration. An effective interruption of the current circuit takes place only on the simultaneous interruption of both contact wheels, approximately each 1100 yards.

By the aid of several wheels, and several interrupting gaps in each wheel, a great number of variations can be obtained. From the beginning, therefore, the driver does not know when interruption is going to take place. His attention is therefore necessary each time. Besides these time-designed interrupters, it is possible to have, also, interruptions effected in the current circuit by means of mechanical devices disposed at different parts of the line, for example, strikers, with which the locomotive comes into contact, disposed before the entrance to a station or at special places on the journey. It can be frequently settled, in this manner, at any point of the line, whether the driver is at his place, able to carry on his work.

Figure 5:
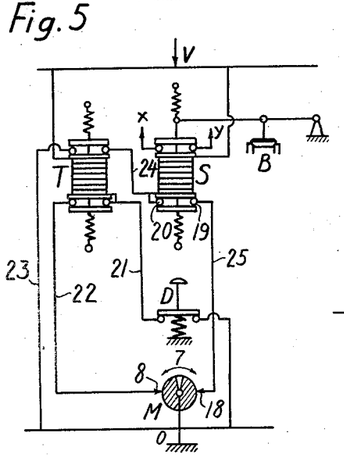

A device for retarding the shutting-off of the power means and the application of the brakes is diagrammatically illustrated in Fig. 5.

In this figure, separate contacts 19 and 20 are provided, through which a special supply of current can be passed by a mechanical interrupter M. In addition a mechanical interrupter T is provided.

This device operates in the following manner.

When the "dead man's button" D is depressed as shown in the figure, the normal travelling conditions exist. The device T is then supplied with closed circuit current through two parallel branches, the one branch comprising the conductor 21 and the "dead man's button" D, and the other the mechanical interrupter M. The safety device S, also, is fed through two parallel branches, the one, 24, through the electromagnet device T and the other, 25, through the mechanical interrupter M. When the "dead man's button" is let go, the current in the conductor 21 is interrupted. The current circuit to T through M is then interrupted when the interrupting gap 7 passes the contact 8. Thereafter the electromagnet T is de-energized and the armature is moved away from the same by spring means. Thereupon, the current through the branch 24 is interrupted whilst the current in the other branch 25 is only interrupted later, after the lapse of a variable time, namely, when the gap 7 passes the contact point 18 which is arranged diametrically opposite the contact 8. In this manner, the time requisite for the aforesaid retardation is allowed to elapse. In Fig. 4, automatic interruption is followed by a positive operation, which is obtained by connecting a parallel conductor with the electromagnet S over the contacts 19, 20 from one of the differential wheels M adjacent to a contact piece 18. The electromagnet S, in this case, receives current both through the said conductor and through the conductor over the "dead man's button", Fig. 3. When the electromagnet Z (Fig. 3) is de-energized by the mechanically actuated interrupter, the current circuit to the electromagnet S is maintained during a half revolution of the wheel M corresponding to about 55 yards, whereafter current interruption takes place in the magnet S if the electromagnet Z is not energized in the course of the time corresponding to such distance by movement of the "dead man's button". In connection with the time-adjustable safety device in Fig. 2, it may be mentioned that by this arrangement, an advantage is obtained due to the safety device being saved from wear and tear. With the arrangement shown in Fig. 4, the conductors cannot be united in the point 16, as shown in Fig. 3, but the circuit comprises the contacts 12 and 13, whence current flows over the contacts 21, 22 to earth, and the electromagnets S and Z work independently of each other.

Figures 6, 7, 8, 9:
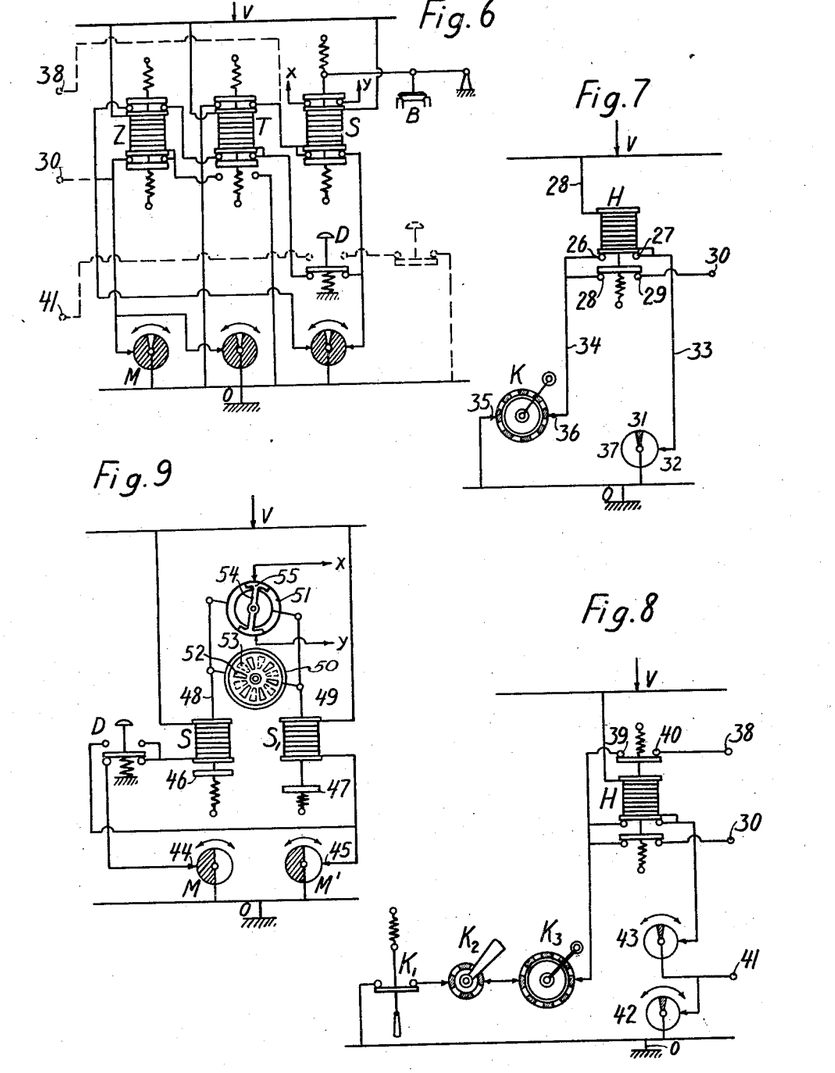

Fig. 6 shows a combination of the construction shown in Figs. 4 and 5, the electromagnet P being replaced by T. This arrangement possesses all the properties of the movable "dead man's button" and effects, in addition, a positive operation of the power means and brakes, both after a mechanically-effected interruption and an interruption effected by letting go the "dead man's button".

From the moment when the "dead man's button" is let go till the moment when the operation of the power means and brakes takes place, a predetermined time elapses, depending on the distance of the interrupting gap at the moment of starting from the contact 8, and a further period (or length of travel) then passes before the gap comes opposite the contact 18. If the average total time for a distance of about 110 yards is selected, the time is adjusted between the limits 55 yards and 165 yards, which is generally sufficient.

By using two or more electromagnets T it is possible to effect variation at will.

When the "dead man's button" is depressed, the normal running conditions are immediately re-established.

A device for facilitating the operation is illustrated in Fig. 7. By this device, the operation of the "dead man's button" under normal conditions can be made superfluous for a short time if any regulating handle of the locomotive is to be operated. The arrangement may partly be such that the "dead man's button" does not need to be depressed for about the first 55 yards according to the movement of the hand-grip. This has special significance during starting. Part of the arrangement may also be such that a depressed button need not be let go when a movement of a hand-grip has taken place in the last 550 yards before the release should normally have occurred.

In the above described arrangements, a new central electromagnet current breaker H and a contact device K are provided, which latter is connected with any of the usual handles of the locomotive. The arrangement in the drawing is made for open circuit current but it can be made equally well for closed circuit current.

The device works in the following manner:—

In the indicated position, the contacts 26, 27 of the electromagnet H are opened, the handle K is in the normal position, and a current passes through K and the contacts 28, 29 to the terminal 30. This point can be connected with the electromagnet S shown in any of Figs. 3, 4 and 6 so that the electromagnet receives a special supply of current and the passage of the interrupting gap 7 over the contacts 9 is inoperative in respect of the electromagnet S, and, consequently, lifting the "dead man's button" is unnecessary for maintaining onward movement. The terminal 30 can be connected with the automatic safety device S in such a manner that the "dead man's button" is short circuited so long as the said special current flows. When the contact field 31 has passed the contact piece 32, the connections through the contacts 28, 29 is still permanently interrupted because the electromagnet H is held by a rush of current through conductor 33, and is kept excited by a current through the conductor 34, contacts 26, 27 and conductor 28 so long as the device K is in normal position. The other safety device previously described has no connection with this arrangement and must be in the usual manner when a movement of the handle K has taken place in the period between the movement of the contact field 31 past the contact piece 32 and the passage of the gap 7 past the contact 8 (about half a revolution), so that the current to the electromagnet H over the contacts 35, 36 is again interrupted and the electromagnet H de-energized. If the handle K is moved from this out-of-normal position forwards or backwards in the normal position, the condition shown in the drawing is restored and the first time the gap 7 passes the contact 8 (Fig. 3), it is once more inoperative in respect of the safety device.

A movement of the handle K while the contact field 31 moves from the contact piece 37 to the contact piece 32 is without effect.

The contact pieces 8 and 32 are set diametrically opposite so that the likelihood of operation and that of non-operation are the same.

In Fig. 8, several handles $K_1$, $K_2$, $K_3$ in normal position are connected in series. The operation is effected when one of the handles is moved out of the normal position. Besides the terminal 30, a corresponding terminal 38 is arranged in connection with contacts 39, 40 so that the device is connected to the terminal 41 both when the "dead man's button" is lifted and depressed, whereby the differential wheel 42 is short circuited, (c. f. dotted lines, Fig. 6). The electromagnet H then goes out of operation after about 110 yards. If the "dead man's button" remains depressed, the differential wheel 43 acts so that the electromagnet H goes out of operation only after about 1100 yards, which obviates the necessity of releasing the "dead man's button" over this stretch.

The handle K (Fig. 7) or the several handles $K_1$, $K_2$, $K_3$, (Fig. 8) connected in series can also be used during starting in the rare case when the locomotive has possibly been brought to a stop by the apparatus with the automatic device run out exactly in the interrupted position of the mechanical switch.

An arrangement for obviating any harmful effects which might result from technical failure is shown in Fig. 9. Two electromagnets S and $S_1$ are fed by spring-pressed "dead man's button" D, independently of each other, with closed circuit current and open circuit current exchangeable by the contact drums M, $M^1$, which are run synchronously but independently of each other, for example, through the medium of two different wheels of the locomotive, driven so that, when the contact 44 touches the conducting half of the contact roller, the contact 45 touches the insulated half, and vice versa. The current through the contact 44 is interrupted at the same moment as the current circuit is closed through the contact 45, and vice versa. In this way, the armature 46 of the one electromagnet is attracted when the armature 47 of the other electromagnet is moved away. The armatures are connected with rods 48 and 49 which move a rotatable part of the disc valve 50 and a rotatable contact 51, which closes the current circuit for stopping purposes. In the illustrated position, the valve is closed and the contacts for the flow of current are also closed. This normal running condition continues so long as the electromagnets are moved inversely. If both electromagnets are simultaneously energized or de-energized, for example, if one receives current at the wrong time due to a failure, or the current is interrupted at the wrong time, or if the "dead man's button" is lifted and the magnets are consequently operating in parallel, then the brake valve 50 and the rotatable contact 51 open, the movable parts thereof taking up positions wherein the openings 52 and 53 cover one another at the same time as the contacts 54 and 55 move out of contact. Electric failures in the device must consequently effect a stoppage. Mechanical failures, which prevent the correctly timed movement of one or the other of the parts effects a stoppage because the directly opposite position of the parts is disturbed.

Figure 10:
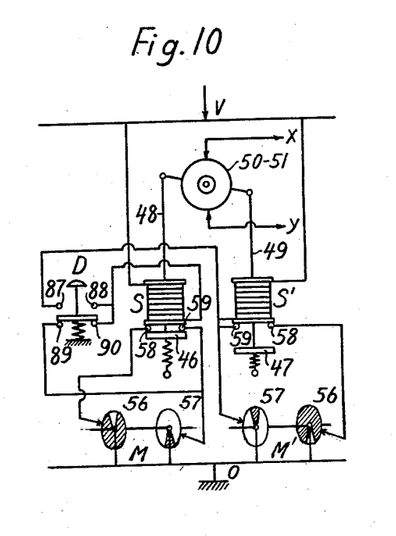

In Fig. 10, the same principle is shown in another form in that the contact drums M, $M^1$ are provided with a conducting contact ring 56 having an interrupting gap and an insulated ring 57, having a contact field. By means of the contacts 58 and 59, the electromagnets are controlled in the same manner.

The devices shown in Figs. 9 and 10 correspond with a device according to Fig. 1.

Figure 11:
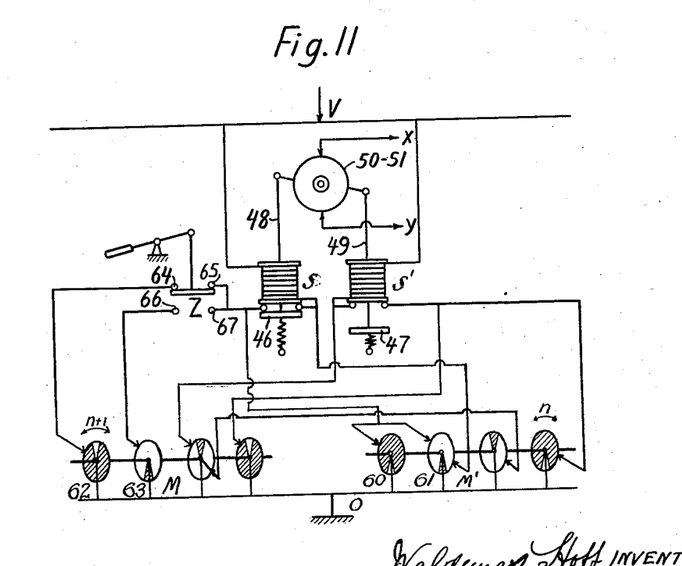
Figure 12:
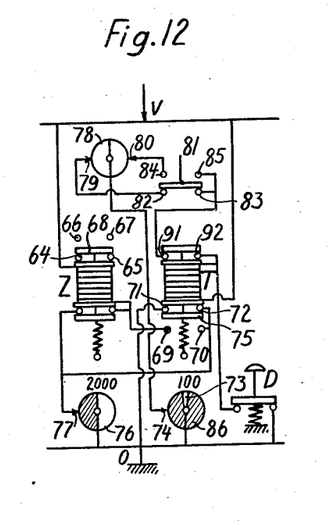
Figure 13:
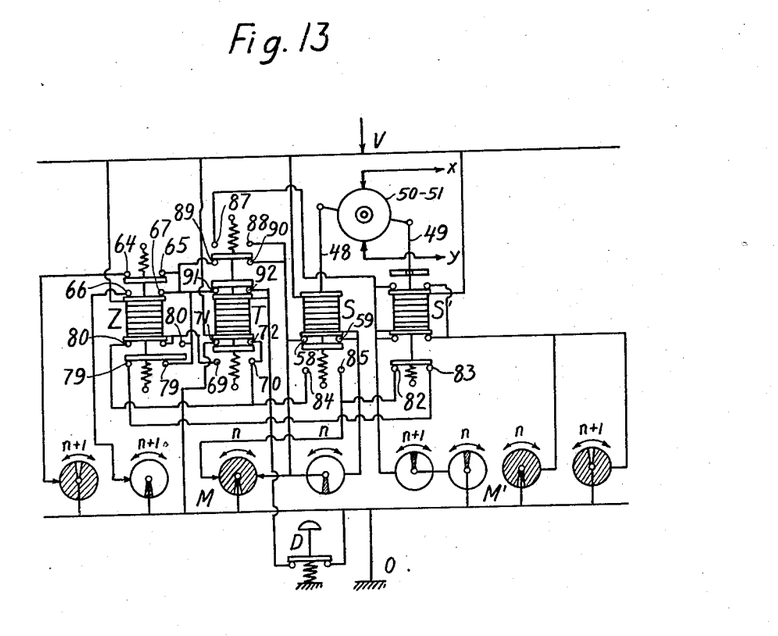

In Figs. 11, 12 and 13 is illustrated the combination of these devices with parts which effect a positive operation of the power means and brakes, and which act so that the "dead man's button" must be moved periodically.

Fig. 11 shows the principle of the movable "dead man's button" with positive operation after interruption. The arrangement corresponds with Fig. 4, which figure, however, contains only the parts which are necessary to illustrate the bare principle. The mechanically operated interrupter is actuated automatically by the electromagnets as shown in Fig. 11. The electromagnet $S^1$ always permits free movement, whilst a turn of the commutator Z must be effected for the electromagnet S after each movement. The connections with the contact drum M, which possesses two pairs of wheels 60, 61 and 62, 63 running at different speeds $(n)$ and $(n+1)$, are arranged in such a manner that the one differential 60, 61 is always connected with S, while the second differential 62, 63 is always connected with commutator Z, which, in the upper position, closes the contacts 64, 65 and accordingly puts in circuit the differential 62 for the distance of about 1100 yards necessary for supplying closed circuit current to the electromagnet S. During the other period, the differential 63 is put in circuit, which is necessary when S is actuated by open circuit current. If the commutator Z should not stop half a revolution, at the latest, after commutation, S is returned into the previous position after 55 yards, and consequently is in the same position as $S^1$, which position is maintained for about 1000 yards, the differential wheel which has failed being put into circuit. The train is accordingly stopped. The commutator is much more simple than the hand manœuvred device shown.

In Fig. 12, the commutator Z is moved by an electromagnet whose armature 68 makes connection with the contacts 64, 65 or 66, 67.

The device operates as follows:—

Commutation of the electromagnet S and S¹ takes place at the same time as the contact drums 76 and 78 are turned over from conducting position to insulating position relatively to the contacts 77 and contacts 79 or 80 respectively, or vice versa. At this moment, the interrupting gap 73 is disposed opposite to the contact 74. So long as the "dead man's button" is kept depressed, the commutation has no effect on the electromagnets Z and T. In order to operate Z, the button D must be let go. Electromagnet T is then de-energized because the drum 78 lies so that it is insulated from contact 79, which is connected by contacts 82 and 83 of the commutator with T. When T is deenergized, the contacts 71 and 72, which connect Z directly with the earth, are broken, and, in place of this, the contacts 69 and 70 are closed, which connect Z with the contact drum 76. When the "dead man's button" is again depressed, T is again energized. The contacts 71, 72 are closed, and Z is held fast in its new position. Simultaneously with the reversal of the electromagnet Z, the commutator 81 is reversed so that the latter lies against the contacts 84, 85 during the next period, which effects connection with the opposite side of the drum 78. Consequently, after every change-over of the electromagnet Z, the electromagnet T is connected with the conducting half of the drum 78. The same operation is effected on the next reversal.

If the "dead man's button" is let go at the wrong time, the electromagnet T is not de-energized before the interrupting gap 73 passes the contact piece 74, which happens half a revolution before the said interrupting gap effects interruption in S. In this case, therefore, positive operation of the power means and brakes is effected.

Fig. 13 shows a combination of the arrangements according to Figs. 10, 11 and 12, and illustrates a complete device with the same properties as the arrangement shown in Fig. 6. It may be remarked that the different contact wheels, shown in the drawing of drums 76 and 78, correspond to different cross sections of a contact drum which moves at ($n$) revolutions and a differential drum which moves at ($n+1$) revolutions.

Figure 14:
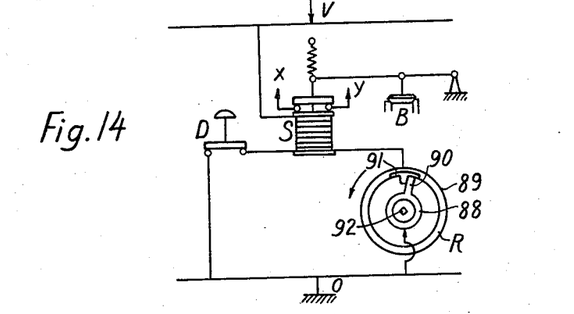

Means for putting the safety device out of action during shunting is shown in Fig. 14, which means is shown, for simplicity, in combination with a device according to Fig. 1. Nevertheless, the means shown in Fig. 14 can be used with any safety device.

The device comprises a contact wheel R which, under normal conditions, short circuits the "dead man's button" D, and connects the safety device directly to the earth. A contact ring 88 is fixed to the spindle 92 which, for example, is rotated once in each 1100 yards by the intermediary of the locomotive if the spring 90 is held against the stop 91. This stop carries with it the loose contact ring 89, when the rotation takes place in the direction of the arrow, and thereby puts the contact device out of action. On movement in the opposite direction from the arrow, the loose ring 89 is carried with the stop 91 until a complete revolution is made. During this revolution, contact exists between the spring 90 and the ring 89 which remains stationary. Only in both end positions is the connection interrupted, by means of the insulating stop 91.

For open circuit current, an insulating wheel having a contact stop is arranged in series with the automatic safety device, instead of contact wheels arranged in parallel. For arrangements operating on either open circuit or closed circuit current, it is possible to use both kinds of wheels, with synchronous operation.

Various modifications may be made in the invention without departing from the scope thereof. For example, instead of effecting the automatic emergency control by electrical means, I may use mechanical means and also means such as compressed air. It will also be understood that short circuiting may be employed instead of current interruption.

I claim:—

1. Safety apparatus for locomotives controlled by a single operator, comprising, in combination, an automatic control device whereby said locomotive can be maintained in operation or stopped; a "dead man's button" normally held by said operator; means for operating said control device so that normally the holding or release of said button maintains in operation or stops respectively the said locomotive; interrupting means driven by said locomotive; means whereby said interrupting means is adapted to operate said control device at intervals in a manner adapted to maintain in operation or stop said locomotive; and means whereby said control device, after operation so as to stop said locomotive, can be again operated by said button so as to be reset and maintain said locomotive in normal operation.

2. Safety apparatus for locomotives controlled by a single operator, comprising, in combination, an automatic control device whereby said locomotive can be maintained in operation or stopped; a "dead man's button" normally held by said operator; means for operating said control device so that normally the holding or release of said button maintains in operation or stops respectively the said locomotive; interrupting means driven by said locomotive; means whereby said interrupting means also serves, when said button is held, to operate said control device at intervals in a manner adapted to maintain in operation or stop said locomotive; and means whereby said control device after operation by said interrupting means so as to stop said locomotive can be again operated by said button so as to reset said control device and maintain said locomotive in normal operation.

3. Safety apparatus for locomotives controlled by a single operator, comprising, in combination, an automatic control device whereby said locomotive can be maintained in operation or stopped; a "dead man's button" normally held by said operator; electrical means for operating said control device so that normally the holding or release of said button maintains in operation or stops respectively the said locomotive; interrupting means mechanically driven by said locomotive; electrical means whereby said interrupting means also serves, when said button is held, to operate said control device in a manner adapted to maintain in operation or stop said locomotive, and electrical means whereby said control device after operation by said interrupting means so as to stop said locomotive can be again operated by said button so as to reset said control device before retardation of said locomotive and maintain said locomotive in normal operation.

4. Safety apparatus for locomotives controlled by a single operator, comprising, in combination, an automatic control device whereby said locomotive can be maintained in operation or stopped; a "dead man's button" normally held by said operator; an electro-magnet; contact means adapted to be closed or opened by said button when held or released respectively so as to energize or de-energize said electromagnet; and armature adapted to separate from said electromagnet when de-energized so as to operate said control device to stop said locomotive; interrupting means mechanically driven by said locomotive; electrical means whereby said interrupting means also serves, when said button is held, to operate said control device in a manner adapted to maintain in operation or stop said locomotive; and electrical means whereby said control device after operation by said interrupting means so as to stop said locomotive can be again operated by said button so as to reset said control device before retardation of said locomotive and maintain said locomotive in normal operation.

5. Safety apparatus for locomotives controlled by a single operator, comprising, in combination, an automatic control device whereby said locomotive can be maintained in operation or stopped; a "dead man's button" normally held by said operator; an electromagnet; contact means adapted to be closed or opened by said button when held or released respectively so as to energize or de-energize said electromagnet; an armature adapted to separate from said electromagnet when de-energized so as to operate said control device to stop said locomotive, a current interrupter; contact means adapted to be closed and opened at intervals by said interrupter; a second electromagnet; an armature adapted to be attracted towards said second magnet when energized; means for driving said interrupter from the locomotive; contact means adapted to be closed or opened by said last mentioned armature so that said interrupter also serves, when said button is held, to operate said control device in a manner adapted to maintain in operation or stop said locomotive; contact means adapted to be closed when said button is released so as to energize said last mentioned electromagnet; and means whereby, when said button is again depressed, said last mentioned electromagnet remains energized and whereby said control device can be reset after each interruption of current by the interrupter so as to maintain said locomotive in normal operation.

6. Safety apparatus for locomotives controlled by a single operator, comprising, in combination, an automatic control device whereby said locomotive can be maintained in operation or stopped; a "dead man's button" normally held by said operator; means for operating said control device so that normally the holding or release of said button maintains in operation or stops respectively said locomotive; interrupting means driven by said locomotive; means whereby said interrupting means is adapted to operate said control device at intervals in a manner adapted to maintain in operation or stop said locomotive; means whereby operation of said control device so as to stop said locomotive takes place only a definite time after release of said button; and means whereby said control device, after operation so as to stop said locomotive, can be again operated by said button so as to be reset and maintain said locomotive in normal operation.

7. Safety apparatus for locomotives controlled by a single operator, comprising, in combination, an electrically operable control device whereby said locomotive can be maintained in operation or stopped; a "dead man's button" normally held by said operator; electrical means for operating said control device so that normally the holding or release of said button maintains in operation or stops respectively said locomotive; an electric current interrupter driven by said locomotive; electrical means arranged in series with said interrupter and in parallel with said button whereby said interrupting means is adapted to operate said control device at intervals in a manner adapted to maintain in operation or stop said locomotive; means whereby interruption of current to said control device through said interrupter takes place only after a definite time from the interruption of current to said control device through said button; and means whereby said control device, after operation so as to stop said locomotive, can be again operated by said button so as to be reset and maintain said locomotive in normal operation.

8. Safety apparatus for locomotives controlled by a single operator, comprising, in combination, an electrically operated control device whereby said locomotive can be maintained in operation or stopped; a "dead man's button" normally held by said operator; an electric current interrupter driven by said locomotive; an electromagnet adapted to be energized by current through said button and also by current through said interrupter; a second electromagnet adapted to be energized or de-energized and thereby operate said control device to maintain in operation or stop said locomotive; contact means adapted to be closed or opened by said first mentioned electromagnet to supply or cut off a current energizing said second electromagnet; conducting means whereby said second electromagnet is also energized by a second electric current; and contact means in series with said conducting means and adapted to be opened by said interrupter at a definite time after release of said button.

9. Safety apparatus for locomotives controlled by a single operator, comprising, in combination, an automatic control device whereby said locomotive can be maintained in operation or stopped; a number of "dead man's buttons" one of which is normally held by the operator; an electromagnet adapted to be energized by any of said buttons when depressed; an armature adapted to be attracted by said electromagnet; contact means adapted to be opened and closed by said armature; electric conducting means adapted to supply current for operating said control device so that normally the holding or release of the button used by said operator maintains in operation or stops said locomotive; interrupting means mechanically driven by said locomotive; electrical means whereby said interrupting means is adapted to operate said control device at intervals in a manner adapted to maintain in operation or stop said locomotive; and means whereby said control device, after operation so as to stop said locomotive, can be again operated by said button so as to be reset and maintain said locomotive in normal operation.

10. Safety apparatus for locomotives controlled by a single operator, comprising, in combination, an automatic control device whereby said locomotive can be maintained in operation or stopped; a "dead man's button" normally held by said operator; electrical means for operating said control device so that normally the holding or release of said button maintains in operation or stops respectively the said locomotive; an electrical current interrupter driven by said locomotive; a second current interrupter driven by said locomotive at a different speed from said first mentioned interrupter; contact means adapted to be closed and opened at intervals by said second interrupter; second contact means in parallel with said first mentioned contact means and adapted to be closed and opened at intervals by said second interrupter; means whereby said first and second interrupters are connected in parallel to the electrical means for operating said control device; and electrical means whereby said control device after operation by said interrupters so as to stop said locomotive can be again operated by said button so as to reset said control device before retardation of said locomotive and maintain said locomotive in normal operation.

11. Safety apparatus for locomotives controlled by a single operator, comprising, in combination, an automatic control device whereby said locomotives can be maintained in operation or stopped; a number of "dead man's buttons" one of which is normally held by the operator; an electromagnet adapted to be energized by any of said buttons when depressed; an armature adapted to be attracted by said electromagnet; contact means adapted to be opened and closed by said armature; electric conducting means adapted to supply current for operating said control device so that normally the holding or release of the button used by said operator maintains in operation or stops said locomotive; interrupting means driven by said locomotive; electrical means whereby said interrupting means is adapted to operate said control device at intervals in a manner adapted to stop said locomotive; means whereby operation of said control device so as to stop said locomotive takes place only a definite time after release of said button; and means whereby said control device, after operation so as to stop said locomotive, can be again operated by said button so as to be reset and maintain said locomotive in normal operation.

12. Safety apparatus for locomotives controlled by a single operator, comprising, in combination, an automatic control device whereby said locomotive can be maintained in operation or stopped; a number of "dead man's buttons" one of which is normally held by the operator; an electromagnet adapted to be energized by any of said buttons when depressed; an armature adapted to be attracted by said electromagnet; contact means adapted to be opened and closed by said armature; electric conducting means adapted to supply current for operating said control device so that normally the holding or release of the button used by said operator maintains in operation or stops said locomotive; an electrical current interrupter driven by said locomotive; a second current interrupter driven by said locomotive at a different speed from said first mentioned interrupter; contact means adapted to be closed and opened at intervals by said interrupter; second contact means in parallel with said first mentioned contact means and adapted to be closed and opened at intervals by said second interrupter; means whereby said first and second interrupters are connected in parallel to the electrical means for operating said control device; and electrical means whereby said control device after operation by said interrupters so as to stop said locomotive can be again operated by said button so as to reset said control device before retardation of said locomotive and maintain said locomotive in normal operation.

13. Safety apparatus for locomotives controlled by a single operator, comprising, in combination, an automatic control device whereby said locomotive can be maintained in operation or stopped; a "dead man's button" normally held by said operator; electric means for operating said control device so that normally the holding or release of said button maintains in operation or stops respectively said locomotive; an electrical current interrupter driven by said locomotive; a second current interrupter driven by said locomotive at a different speed from said first mentioned interrupter; contact means adapted to be closed and opened at intervals by said interrupter; second contact means in parallel with said first mentioned contact means and adapted to be closed and opened at intervals by said second interrupter; means whereby said first and second interrupters are connected in parallel to the electrical means for operating said control device; means whereby operation of said control device so as to stop said locomotive takes place only a definite time after release of said button; and electrical means whereby said control device after operation by said interrupters so as to stop said locomotive can be again operated by said button so as to reset said control device before retardation of said locomotive and maintain said locomotive in normal operation.

14. Safety apparatus for machines controlled by a single operator, comprising, in combination, an automatic control device whereby said machine can be maintained in operation or stopped; a "dead man's button" normally held by said operator; means for operating said control device, so that normally the holding or release of said button maintains in operation or stops respectively the said machine; interrupting means driven by said machine; means whereby said interrupting means is adapted to operate said control device at intervals in a manner adapted to maintain in operation or stop said machine; and means whereby said control device, after operation so as to stop said machine, can be again operated by said button so as to be reset and maintain said machine in normal operation.

15. Safety apparatus for machines controlled by a single operator, comprising, in combination, an automatic control device whereby said machine can be maintained in operation or stopped; a "dead man's button" normally held by said operator; an electromagnet; contact means adapted to be closed or opened by said button when held or released respectively so as to energize or de-energize said electromagnet; an armature adapted to separate from said electromagnet when de-energized so as to operate said control device to stop said machine; a current interrupter; contact means adapted to be closed and opened at intervals by said interrupter; an electromagnet; an armature adapted to be attracted towards said magnet when energized; means for driving said interrupter from the machine; contact means adapted to be closed or opened by said last mentioned armature so that said interrupter also serves, when said button is held, to operate said control device in a manner adapted to maintain in operation or stop said machine; contact means adapted to be closed when said button is released so as to energize said last mentioned electromagnet; and means whereby, when said button is again depressed, said last mentioned electromagnet remains energized and whereby said control device can be reset after each interruption of current by the interrupter so as to maintain said machine in normal operation.

16. Safety apparatus for locomotives controlled by a single operator, comprising, in combination, an automatic control device whereby said locomotive can be maintained in operation or stopped; a "dead man's button" normally held by said operator; means for operating said control device so that normally the holding or release of said button maintains in operation or stops respectively the said locomotive; interrupting means driven by said locomotive; means whereby said interrupting means is adapted to operate said control device at intervals in a manner adapted to maintain in operation or stop said locomotive; means whereby said control device, after operation so as to stop said locomotive, can be again operated by said button so as to reset and maintain said locomotive in normal operation; and means whereby the effect of said button and interrupting means of said control device can be negatived so as to obviate, when desired, the necessity of operating and holding said button.

17. Safety apparatus for locomotives controlled by a single operator, comprising, in combination, an automatic control device whereby said locomotive can be maintained in operation or stopped; a "dead man's button" normally held by said operator; means for operating said control device so that normally the holding or release of said button maintains in operation or stops respectively the said locomotive; interrupting means driven by said locomotive; means whereby said interrupting means is adapted to operate said control device at intervals in a manner adapted to maintain in operation or stop said locomotive; means whereby said control device, after operation so as to stop said locomotive, can be again operated by said button so as to be reset and maintain said locomotive in normal operation; and means whereby said control device is operated so as to stop said locomotive in the event of failure in any part of the apparatus.

18. Safety apparatus for locomotives controlled by a single operator, comprising, in combination, an automatic control device whereby said locomotive can be maintained in operation or stopped; a "dead man's button" normally held by said operator; means for operating said control device so that normally the holding or release of said button maintains in operation or stops respectively the said locomotive; interrupting means driven by said locomotive; means whereby said interrupting means is adapted to operate said control device at intervals in a manner adapted to maintain in operation or stop said locomotive; means whereby said control device, after operation so as to stop said locomotive, can be again operated by said button so as to be reset and maintain said locomotive in normal operation; and means whereby operation of one of the usual operating handles of the locomotive suspends the necessity for operating said button for a predetermined time, as at starting.

In testimony whereof I affix my signature.

WALDEMAR HOFF.